(12) United States Patent
Kabenjian

(10) Patent No.: US 6,834,351 B1
(45) Date of Patent: Dec. 21, 2004

(54) SECURE INFORMATION HANDLING SYSTEM

(75) Inventor: Greg G. Kabenjian, Duarte, CA (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/430,207

(22) Filed: Oct. 29, 1999

(51) Int. Cl.[7] .............................. G06F 11/30; G06F 12/14
(52) U.S. Cl. ............................ 713/201; 713/182; 707/9; 709/223; 711/163
(58) Field of Search ............................ 713/2, 166, 167, 713/182, 183, 185, 193, 200, 201, 202, 171; 707/9, 10; 709/223, 225, 226, 203; 711/163, 164

(56) References Cited

U.S. PATENT DOCUMENTS

| | | | |
|---|---|---|---|
| 5,201,000 A | 4/1993 | Matyas et al. | 380/30 |
| 5,311,596 A | 5/1994 | Scott et al. | 380/33 |
| 5,542,046 A | 7/1996 | Carlson et al. | 395/186 |
| 5,636,280 A | 6/1997 | Kelly | 380/21 |
| 5,638,444 A | 6/1997 | Chou et al. | 380/21 |
| 5,638,513 A | 6/1997 | Ananda | 395/188.01 |
| 5,706,349 A | 1/1998 | Aditham et al. | 380/25 |
| 5,778,071 A | 7/1998 | Caputo et al. | 380/25 |
| 6,317,831 B1 * | 11/2001 | King | 713/171 |
| 6,578,068 B1 * | 6/2003 | Bowman-Amuah | 709/203 |

* cited by examiner

Primary Examiner—Justin T. Darrow
(74) Attorney, Agent, or Firm—Kevin E. West; Suiter - West

(57) ABSTRACT

A method is disclosed for enabling functions of an information handling system such as startup (i.e., boot), loading of an operating system or execution of a software application, by requiring authentication of the information handling system. A client information handling system establishes a communication link with a central system or server via a network such as a Local Area Network (LAN) or the Internet. A request for authentication is then sent to the central system by the information handling system via the communication link. The central system, upon receiving the authentication request from the information handling system, determines if the authentication request is valid, and, if valid, provides authentication of the information handling system via one or more encrypted tokens passed from the central system to the information handling system, thereby allowing the information handling system to provide or continue to provide the function, even when disconnected from the network.

64 Claims, 8 Drawing Sheets

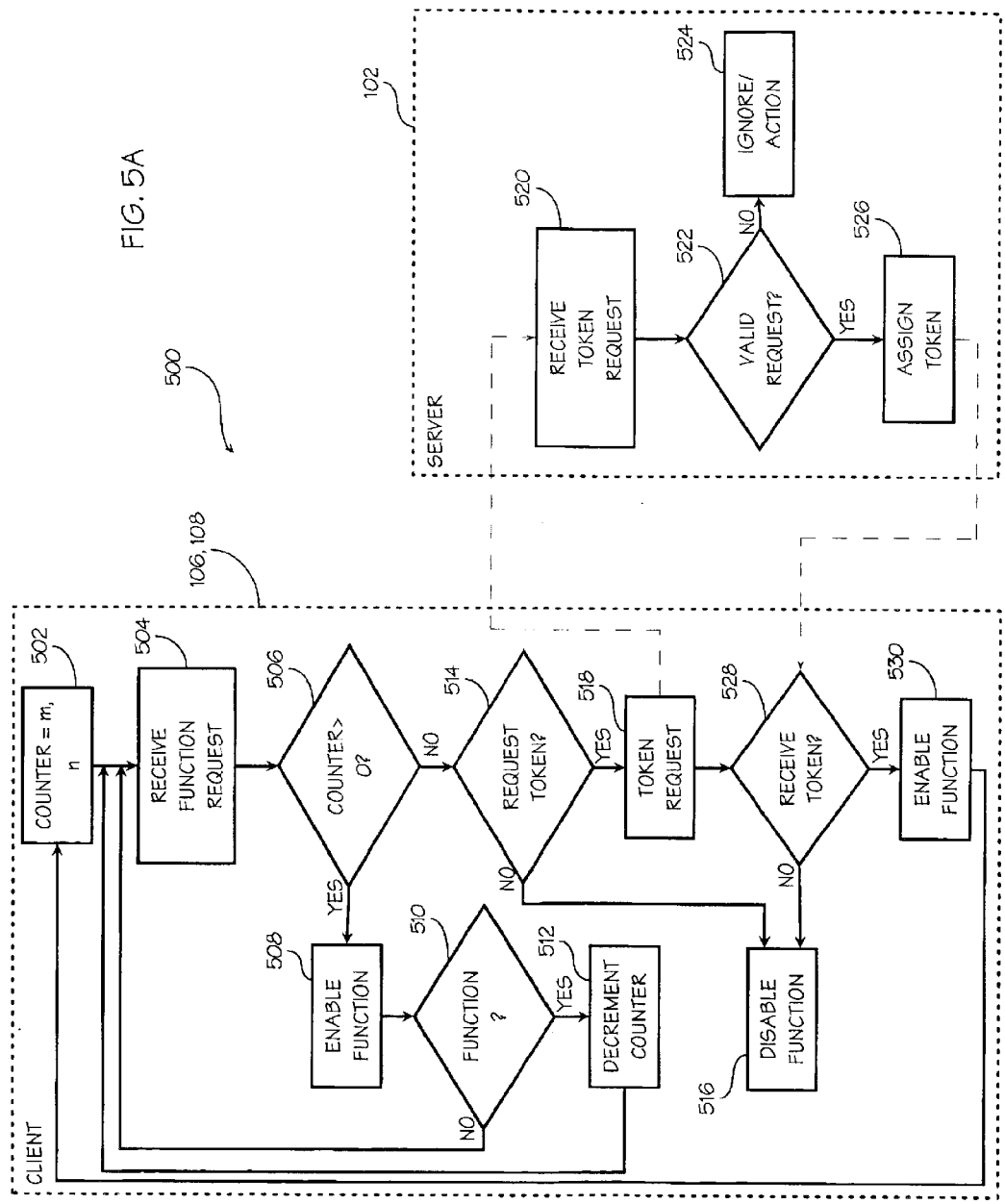

SECURE INFORMATION HANDLING SYSTEM

FIELD OF THE INVENTION

The present invention relates generally to information handling systems, and more specifically to a system and method for securing information handling systems, operating systems, software applications, information and the like against theft or misuse.

BACKGROUND OF THE INVENTION

Information handling systems such as desktop personal computers, portable computers (i.e., laptop or notebook computers) and the like, being valuable assets, have historically been prone to theft or misuse. For example, an enterprise may own several portable computers that are made available for use by personnel at remote sites to perform enterprise-related tasks. Because of their small size and high value, such portable computers may easily be stolen by third parties or by the personnel themselves, and once stolen, are extremely difficult to recover. Likewise, an enterprise may employ a networked computer system available for use by personnel while on the enterprise's premises. Such an enterprise may wish to limit access to the network to curtail unproductive activities such as Internet browsing during working hours.

Proprietary software applications and information utilized by such information handling systems are similarly plagued by problems such as unauthorized use, copying and piracy. With the growing popularity of services such as the Internet, such software applications and information are increasingly provided for sale to consumers via electronic fund transfer and downloaded directly to the consumer's computer. Prevention of unauthorized use or illegal copying of software applications distributed in this manner is extremely difficult and rarely successful. Further, once downloaded, developers of stand-alone software applications (i.e., software applications that do not require support external to the information handling system) have extremely limited means of controlling use of the application. For example, the developer of an application may wish to provide a complementary copy of the application to users and thereafter incrementally charge for its use, disabling use if payment is not received. Presently, this objective is not possible. Thus, sales of the application may be hampered because potential users are unwilling to pay for unlimited use of the application, even though such users may frequently desire the application and would be willing to pay a lesser amount for more limited use if the option was available.

Known to the art are a variety of security systems and methods that limit access to networked information handling systems by unauthorized individuals. Such systems typically require a special access code such as a user identification and/or password, or a special device such as a key or identification card to allow use of the information handling system. However, access codes and devices are frequently lost or forgotten, and may themselves be stolen or copied. Further, such security systems only prevent access to the information handling system network, and do not prevent continued use of client information handling systems while disconnected from the network, for example, if stolen.

Similarly, client/server security systems are known wherein a software application provided via a network such as a local area network (LAN), Wide Area Network (WAN), Online Service Provider, the Internet, etc. is divided into a server component resident on a server computer and a client portion resident on a client computer, wherein the client component essentially serves as the user's interface to the server component. However, while such systems do prohibit unauthorized copying and use of software applications, they require continuous connection of the client computer with the server computer via the network. Such connection requirements often adversely affect the speed and capabilities of the software application especially during periods of high network usage.

For the foregoing reasons, it would be advantageous to provide an improved system and method for securing functions of an information handling system such as startup (i.e., boot), loading of an operating system, execution of a software application, etc. whereby the information handling system must be authenticated by a centralized authority, such as a server or home station, to permit the information handling system to provide or to continue providing the function when disconnected from the system.

SUMMARY OF THE INVENTION

Accordingly, the present invention is directed to a novel system and method for securing functions of an information handling system such as startup (i.e., boot), loading of an operating system or execution of a software application by requiring authentication of the information handling system to enable the function. According to a principal aspect of the present invention, a client information handling system establishes a communication link with a central system. An example would be to connect to a server via a network such as a Local Area Network (LAN), Wide Area Network (WAN), Online Service Provider, or the Internet; or to connect directly with a connection to a home station, a second system or docking station. A request for authentication is sent to the central system by the information handling system via the communication link. The central system, upon receiving the authentication request from the information handling system, determines if the authentication request is valid, and, if valid, authenticates the information handling system allowing the information handling system to provide the function or continue providing the function, even when disconnected from the central system.

In a first exemplary embodiment, the present invention is utilized as an anti-theft system for information handling systems such as desktop and/or portable computers. Authentication is comprised of encrypted tokens passed from the central system to the information handling system via the network to enable operation of the information handling system. Tokens may be stored by the information handling system to allow remote operation of the information handling system independent of the central system. Preferably, each token enables a predetermined amount of start ups, or boot ups, of the information handling system, after which the information handling system is disabled unless communication is reestablished with the central system and additional tokens are requested and received.

In a second exemplary embodiment, the present invention may be utilized to allow incremental charging for the use of software applications and information, and to prevent unauthorized use or copying of software applications and information. A stand-alone software application resident in the information handling system requires authentication of the information handling system for execution. Authentication is comprised of encrypted tokens passed from the central system to the information handling system via the communication link to enable execution of the software application or use of the information. Tokens may be stored by the information handling system to allow continued execution of the application independent of the central system. Preferably, each token enables a predetermined amount of start ups, or some other measure of usage, of the application, after which time execution of the application is disabled unless communication is reestablished with the central system and additional tokens are requested and received.

It is to be understood that both the foregoing general description and the following detailed description are exemplary and explanatory only and are not restrictive of the invention claimed. The accompanying drawings which are incorporated in, and constitute a part of, the specification illustrate embodiments of the invention and, together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 5A is a flow diagram illustrating a method in accordance with the present invention employed by a remote client information handling system;

DETAILED DESCRIPTION OF THE INVENTION

Reference will now be made in detail to the presently preferred embodiments of the invention, examples of which are illustrated in the accompanying drawings.

Figure 1:
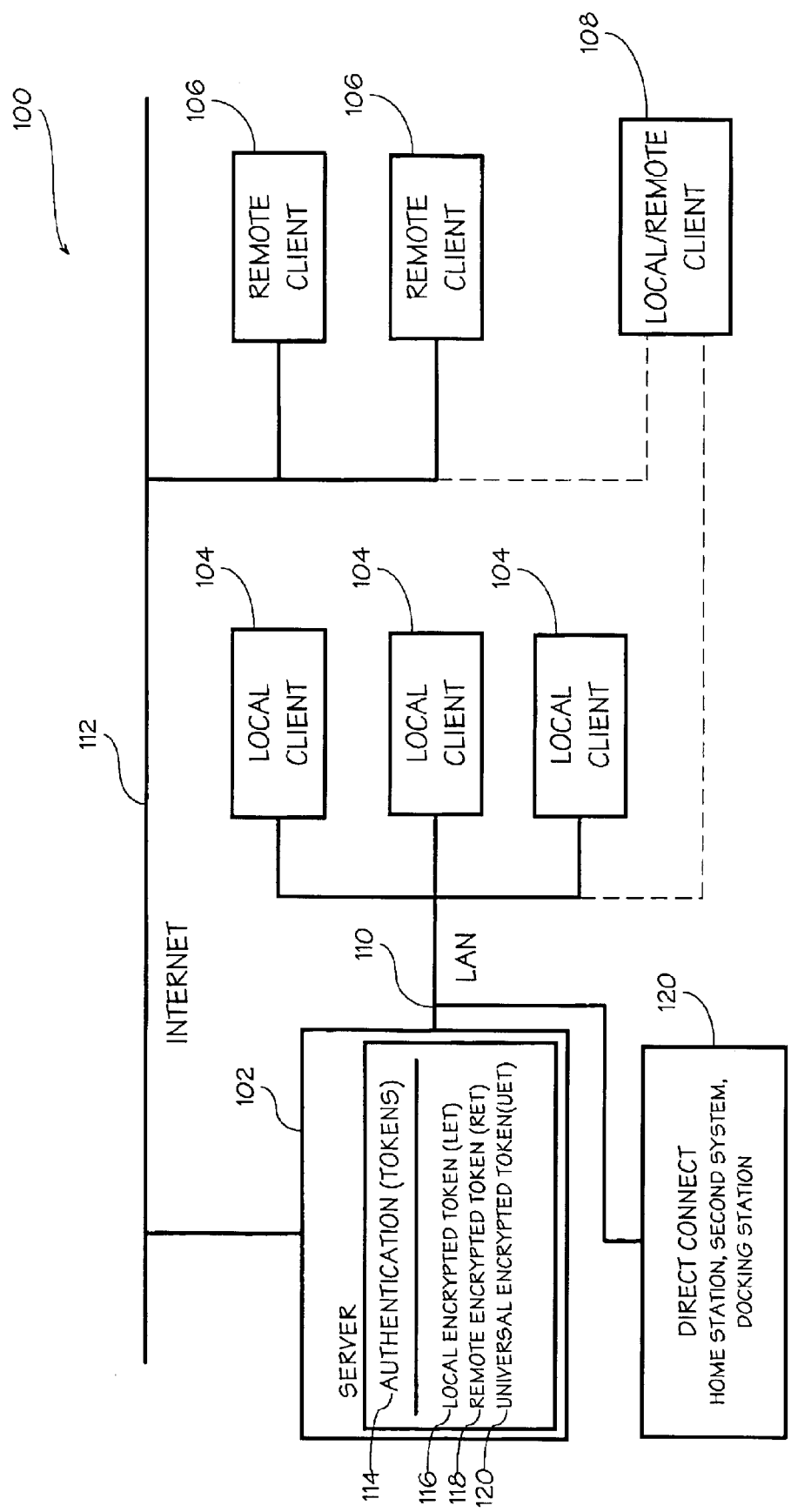
FIG. 1 is block diagram illustrating a central system/client communication link utilizing a system and method of the present invention.

Referring now to FIG. 1, an information handling system network 100 in accordance with the present invention is shown. Information handling system network 100 provides a network architecture that facilitates use of the method of the present invention for securing functions of client information handling systems 104, 106 & 108 including, in various embodiments of the invention, startup (i.e., boot), loading of an operating system, execution of a software application, communication of information, and the like by requiring authentication of the information handling system 104, 106 & 108 to enable provision of or continued provision of the function. Information handling system network 100 is comprised of a central system, namely server 102 or home station 120, and one or more client information handling systems 104, 106 & 108 interconnected by communication facilities 110 & 112. Communication facilities 110 & 112 may be comprised of permanent connections, such as cables, in a Local Area Network (LAN) 110, Wide Area Network (WAN) (not shown), etc., and/or temporary connection made through telephone or other communication links, for example, the Internet 112. Server 102 may be a server information handling system operated, for example, by a management information service (MIS) organization within an enterprise owning and operating client information handling systems 104, 106 & 108, a service provider engaged in electronic commerce with client information handling systems 104, 106 & 108, or the like. Client information handling systems 104, 106 & 108 are comprised of local clients 104 interconnected with server 102 from a specific locale via a permanent (LAN) connection 110, location independent remote clients 106 interconnected with server 102 via a temporary telephone (Internet) connection 112, and/or combination local/remote clients 108 capable of interconnection with server 102 from either a permanent (LAN) connection 110 or a location independent temporary (Internet) connection 112. It is also understood that this system can be incorporated into a "smaller" scale, including use by an individual that seeks to protect the contents of his or her client information handling system. In a smaller scale approach, the central system may comprise a home station 120, which may take the form of a second system, a docking station, or some other form of authenticating central system.

Figure 2:
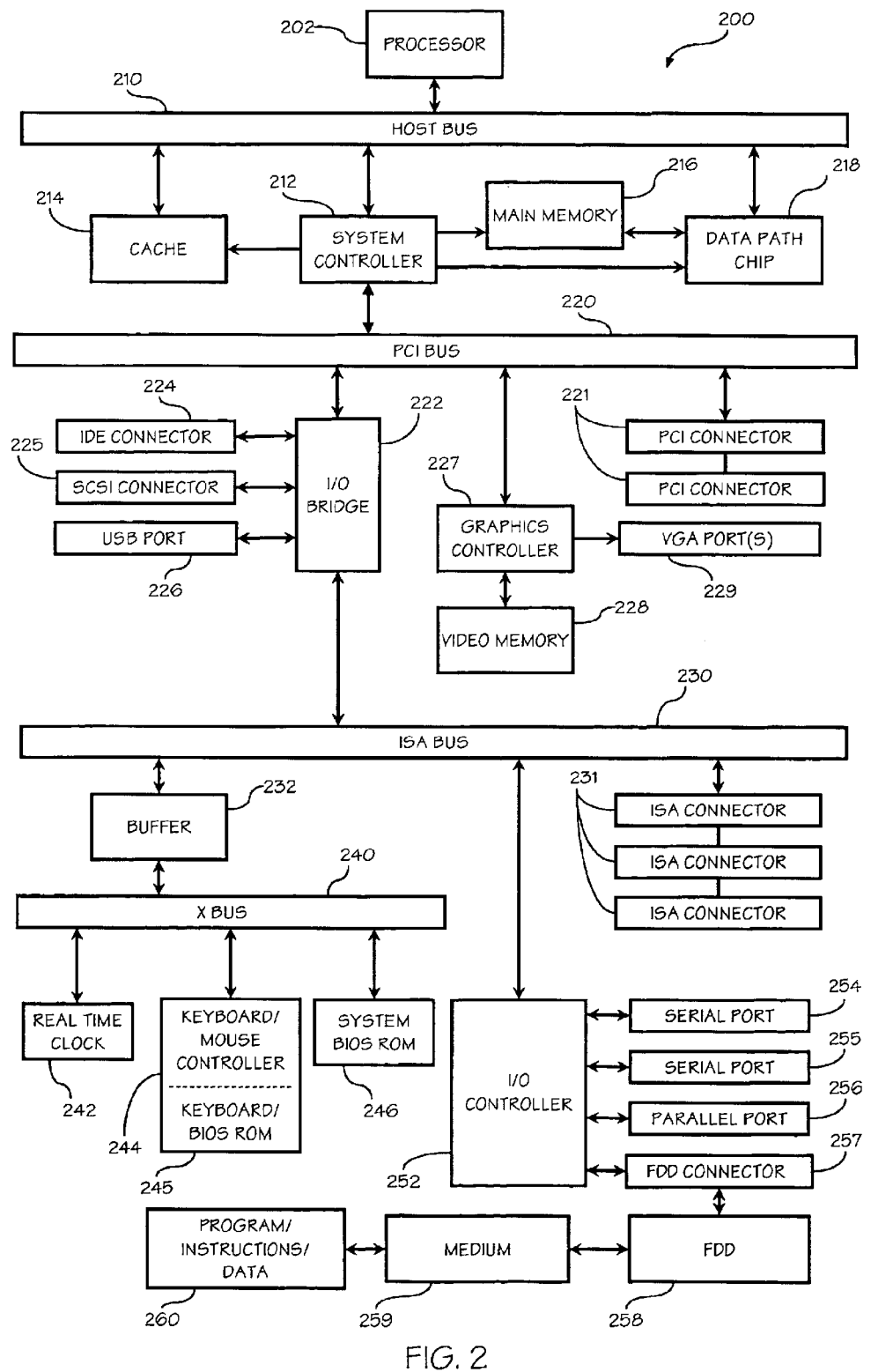
FIG. 2 is a block diagram illustrating an exemplary computer based information handling system such as the central system and client information handling system shown in FIG. 1.

In FIG. 2, an exemplary hardware architecture of an information handling system 200 such as server 102 and client information handling systems 104, 106 & 108 of FIG. 1 is shown. In this embodiment, processor 202, system controller 212, cache 214, and data-path chip 218 are each coupled to host bus 210. Processor 202 is a microprocessor such as a 486-type chip, a Pentium®, Pentium II®, Pentium III®, or the like suitable microprocessor. Cache 214 provides high-speed local-memory data (in one embodiment, for example, 512 KB of data) for processor 202, and is controlled by system controller 212, which loads cache 214 with data that is expected to be used soon after the data is placed in cache 214 (i.e. in the near future). Main memory 216 is coupled between system controller 212 and data-path chip 218, and in one embodiment, provides random-access memory of between 16 MB and 128 MB of data. In one embodiment, main memory 216 is provided on SIMMs (Single In-line Memory Modules), while in another embodiment, main memory 216 is provided on DIMMs (Dual In-line Memory Modules), each of which plugs into suitable sockets provided on a motherboard holding these components and many of the other components shown in FIG. 2. Main memory 216 includes standard DRAM (Dynamic Random Access Memory), EDO (Extended Data Out) DRAM, SDRAM (Synchronous DRAM), or the like suitable memory technology. System controller 212 controls PCI (Peripheral Component Interconnect) bus 220, a local bus for system 200 that provides a high-speed data path between processor 202 and various peripheral devices, such as video, disk, network, etc. Data-path chip 218 is also controlled by system controller 212 to assist in routing data between main memory 216, host bus 210, and PCI bus 220.

In one embodiment, PCI bus 220 provides a 32-bit-wide data path that runs at 33 MHz. In another embodiment, PCI bus 220 provides a 64-bit-wide data path that runs at 33 MHz. In yet other embodiments, PCI bus 220 provides 32-bit-wide or 64-bit-wide data paths that run at higher speeds. In one embodiment, PCI bus 220 provides connectivity to I/O bridge 222, graphics controller 227, and one or more PCI connectors 221, each of which accepts a standard PCI card. In one embodiment, I/O bridge 222 and graphics controller 227 are each integrated on the motherboard along with system controller 212, in order to avoid a board-to-connector-to-board signal crossing interface and thus provide better speed and reliability. In the embodiment shown, graphics controller 227 is coupled to a video memory 228 that includes memory such as DRAM, EDO DRAM, SDRAM, or VRAM (Video Random Access Memory), and drives VGA (Video Graphics Adapter) port 229. VGA port 229 can connect to VGA-type or SVGA (Super VGA)-type displays or the like. Other input/output (I/O) cards having a PCI interface can be plugged into PCI connectors 221.

In one embodiment, I/O bridge 222 is a chip that provides connection and control to one or more independent IDE and/or SCSI connectors, 224 and 225 respectively, to a USB (Universal Serial Bus) port 226, and to ISA (Industry Standard Architecture) bus 230. In this embodiment, IDE connector 224 may provide connectivity for standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In another similar embodiment (not shown), two IDE connectors 224 may be provided, and each provide the EIDE (Enhanced IDE) architecture. In the embodiment shown, SCSI (Small Computer System Interface) connector 225 provides connectivity for preferably up to seven or fifteen SCSI-type devices (depending on the version of SCSI supported by the embodiment). In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, FDD connector 257 is connected to FDD 258 that receives removable media (floppy diskette) 259 upon which data and/or program code 260 is stored. In one such embodiment, program code 260 includes code that controls programmable system 200 to perform the methods described herein. In another such embodiment, serial port 254 is connectable to a computer network such as the Internet, and such network has program code 260 that controls programmable system 200 to perform the methods described herein. In one embodiment, ISA bus 230 is connected to buffer 232, which is connected to X bus 240, which provides connections to real-time clock 242, keyboard/mouse controller 244 and keyboard BIOS ROM (Basic Input/Output System Read Only Memory) 245, and to system BIOS ROM 246.

FIG. 2 shows one exemplary embodiment of the present invention. However other bus structures and memory arrangements are specifically contemplated. In one embodiment, I/O bridge 222 is a chip that provides connection and control to one or more independent IDE and SCSI connectors, 224 and 225 respectively, to a USB (Universal Serial Bus) port 226, and to ISA (Industry Standard Architecture) bus 230. In this embodiment, IDE connector 224 provides connectivity for standard IDE-type devices such as hard disk drives or CD-ROM (Compact Disk-Read-Only Memory) drives. In one such embodiment, IDE connector 224 provides the EIDE (Enhanced IDE) architecture. In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, ISA bus 230 is connected to buffer 232, which is connected to X bus 240, which provides connections to real-time clock 242, keyboard/mouse controller 244 and keyboard BIOS ROM (Basic Input/Output System Read Only Memory) 245, and to system BIOS ROM 246. It should be appreciated that modification or reconfiguration of information handling system 200 of FIG. 2 by one having ordinary skill in the art would not depart from the scope or the spirit of the present invention.

Referring again to FIG. 1, in an exemplary embodiment, authentication of client information handling systems 104, 106 & 108 to enable a function is provided via encrypted network codes or tokens 114 passed from server 102 to client information handling systems 104, 106 & 108 via communication links or networks 110 & 112. In general, three basic types of tokens may be provided: local encrypted tokens (LET) 116 provided to local client information handling systems 104 or local/remote client information handling systems 108 connected to LAN 110 as local clients; remote encrypted tokens (RET) 118 provided to remote client information handling systems 106 or local/remote information handling systems connected as remote clients via Internet 112; and universal encrypted tokens (UET) 120 provided to any of local client information handling systems 104, remote information handling systems 106 and local/remote information handling systems 108.

It is understood that other means of authentication, such as codes, time based keys, etc. may be used to implement the present invention. However, in a preferred embodiment, tokens 114 allow provision of a function or continued provision of a function by client information handling systems 104, 106 & 108 independent of central system server 102 or home station 120. Thus, unlike prior network security systems, continuous communication between client information handing systems 104, 106 & 108 and central system is not required, and the client information handling systems 104, 106 & 108 may be capable of autonomous operation while providing the function once authenticated by receipt of tokens 114. However, should client information handling systems 104, 106 & 108 attempt to provide the function without authentication provided by tokens 114, or once authentication provided by tokens 114 has expired, the function is automatically disabled until such time as tokens 114 providing authentication are received.

Local encrypted tokens (LET) 116 enable a single function and are preferably not stored by local client information handling system 104. Remote and universal encrypted tokens (RET & UET) 116 & 118 may be stored by client information handling systems 104, 106 & 108 until such time as enablement of the function is requested. Preferably, each token 116 & 118 enables a predetermined amount of use of, and access to, the information handling system to provide the function, after which provision of the function by the information handling system 104, 106 & 108 is disabled unless communication is established with central system 102 or 120, and additional tokens 114 are requested and received.

Figure 3A:
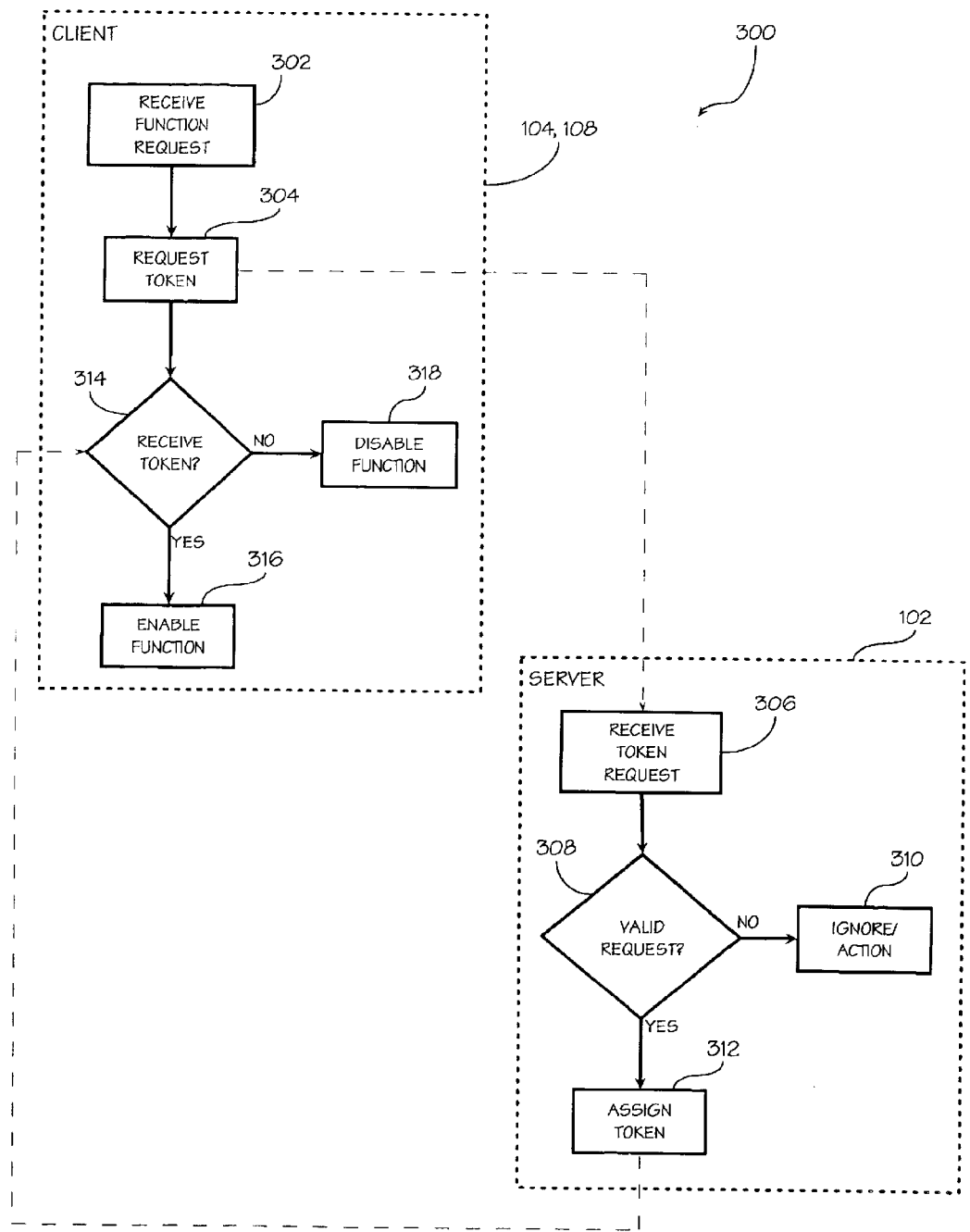
FIG. 3A is a flow diagram illustrating a method in accordance with the present invention employed by a client information handling system.
Figure 3B:
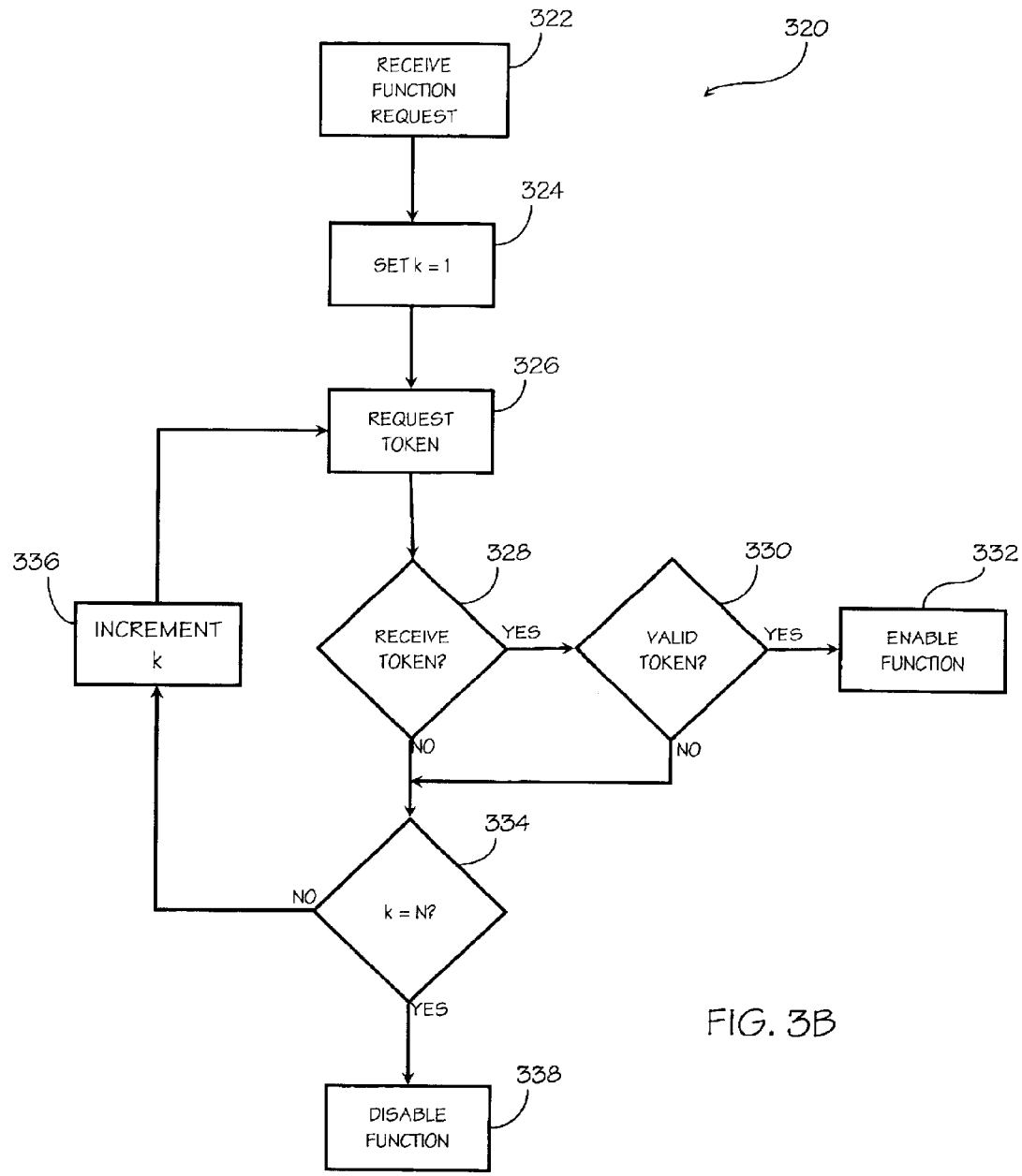
FIG. 3B is a flow diagram illustrating an alternative embodiment of the client portion of the method shown in FIG. 3A.
Figure 4:
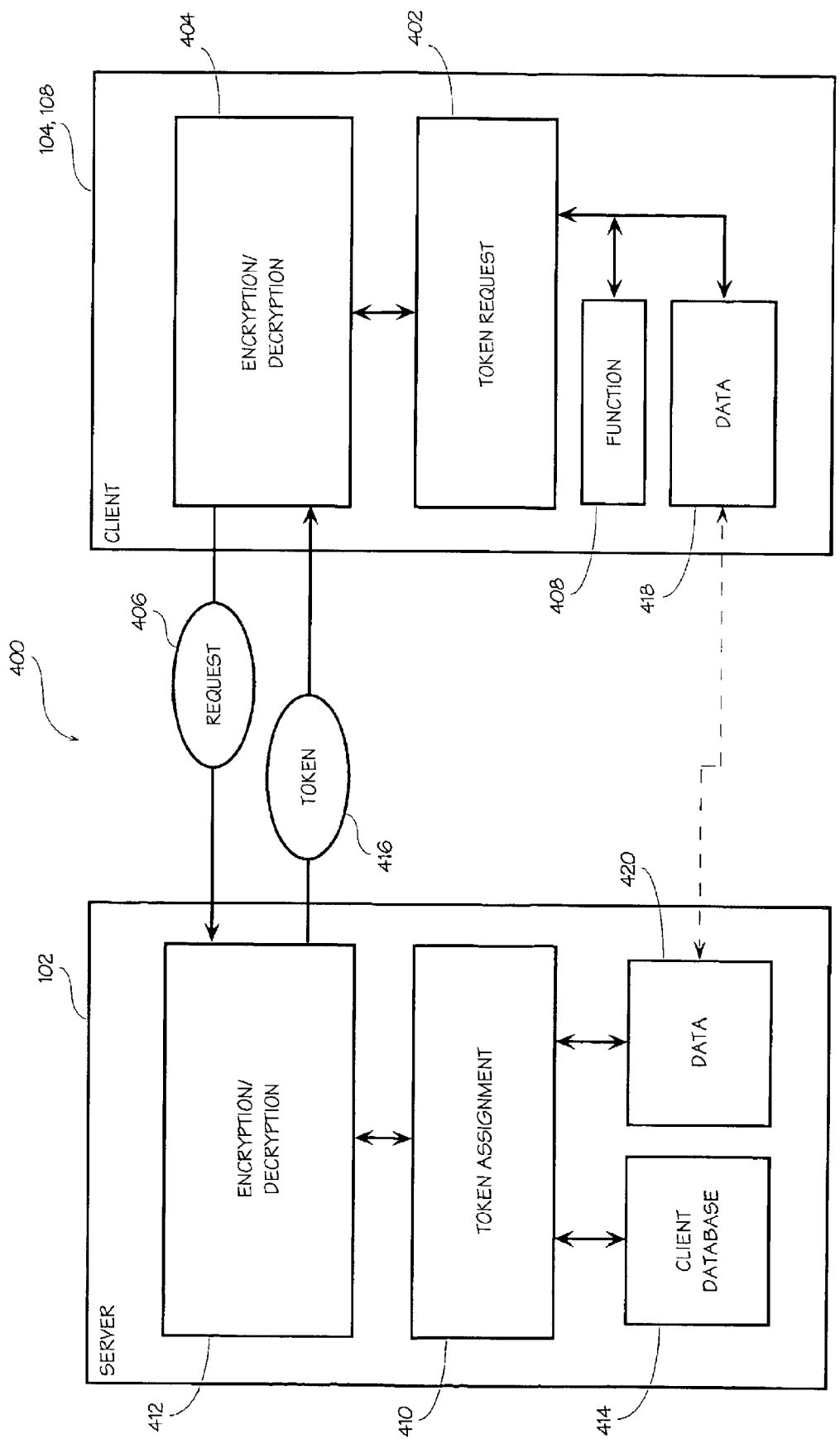
FIG. 4 is block diagram illustrating interaction between the central system and a client information handling system in a local network system.

Turning now to FIGS. 3A, 3B and 4, flow and block diagrams illustrating implementation of the method of the present invention in a local client information handling system 104 or, alternatively, a local/remote information handling system 108 (see FIG. 1), functioning as a local information handling system are shown. The remaining discussion will use the server 102 as a preferred embodiment for the central system, although it is to be understood that a smaller scale system, wherein the central system comprises a home station 120, may be implemented according to the teachings of the present invention, and that the following use of the term "server 102" is not meant to limit the scope of the present invention to such a server-based system.

As shown in FIG. 3A, method 300 is initiated, at step 302, upon receipt of a command to provide a function requiring authentication of the local client information handling system 104, 108. The client information handling system 104, 108 requests one or more tokens from the server 102, at step 304, to provide authentication thereby enabling the commanded function. A communication link is established between server 102 and client information handling system 104, 108 via a network such as LAN 110 shown in FIG. 1. This communication link may either be established in response to the function request 302, or may be preestablished, and thus may already be in existence when function request 302 is received. The token request broadcast at step 304 preferably includes the identification of the client information handling system 104, 108. Preferably, this identification is permanently encoded within the client information handling system 104, 108 so that it cannot be changed by users of the system 104, 108. The token request may further include additional information required to determine whether the server should provide authentication to enable the function (e.g., whether the client information handling system 104, 108 is authorized to provide the function). Preferably, the token request is encrypted using known encryption techniques to prevent tampering or alteration of the token request by users and third parties desiring unauthorized access to the function.

The token request broadcast by local client information handling system 104, 108 is received, at step 306, by server 102 via the communication link. Server 102 next determines whether the token request is valid at step 308. For example, server 102 may first decrypt the token request if necessary. Server 102 may then compare the identification included within the token request with a list of known clients to verify the identity of the client information handling system 104, 108. Additionally, the server 102 may verify whether the client information handling system is authorized to provide the function requested. Wherein it is determined that the token request is invalid, at step 310, server 102 may either ignore the request, or take remedial action. Such remedial action may include informing the client information handling system 104, 108 via the communication link that the token request is denied and optionally providing the reasons for its denial. Wherein it is determined that the token request is valid, a token is assigned to client information handling system 104, 108 at step 312.

Client information handling system 104, 108, having requested a token at step 304, awaits receipt of a token at step 314. Wherein a token is received, the function is enabled at step 316. Alternately, wherein it is determined that a token has not been received, for example, after a predetermined period of time, the function is disabled, at step 318, until a token can be requested and received.

Alternately, as shown in FIG. 3B, the local client information handling system 104, 108 may employ a method 320 employing a reiterative token request scheme. The reiterative method 320, like the basic method 300, begins, at step 322, with a command to provide a function requiring authentication of the information handling system 104, 108. A counter (k) representing the number of token requests broadcast by information handling system 104, 108 is initialized at step 324, whereupon information handling system 104, 108 requests one or more tokens for enabling the function from server 102, at step 326. Again, as in the basic method 300, a communication link is established between server 102 and client information handling system 104, 108 via network (LAN) 110. This communication link may either be established in response to the function request 322, or may be preestablished for and thus may already be in existence when the function request 322 is received. Client information handling system 104, 108, having requested a token, now awaits receipt of a token at step 328. Wherein a token is received, a second determination is made as to whether the received token is valid, at step 330. Wherein it is determined that a valid token is received, the function is enabled at step 332. Alternately, wherein a token has not been received at step 328, or wherein the received token is determined to be invalid at step 330, an additional determination is made whether the counter (k) is equal to a predetermined number of allowed token request broadcasts (N) 334. If counter (k) does not yet equal N, counter (k) is incremented at step 336 and a token request is again initiated at step 326. However, if counter (k) is equal to N, the function is disabled, at step 338.

As shown in FIG. 4, the method of the present invention may be implemented in the local client information handling system 104, 108 as a program of instructions storable on a medium readable by the information handling system 104, 108. In an exemplary embodiment, this program of instructions is comprised of a token request engine 402 and an encryption/decryption utility 404. A corresponding program of instructions storable on a medium readable by the server 102 includes a token assignment utility 410, an encryption/decryption utility 412 and a client database 414.

Token request engine 402 initiates token requests 406 upon receipt of a request to provide a function 408 requiring authentication. The token request 406 may optionally be encrypted by encryption/decryption utility 404 using known encryption techniques. In this manner, tampering or alteration of the token request by users and third parties desiring unauthorized access to the function is prevented. Preferably, token request engine 402 embeds the client information handling system identification and any other desired information within the token request 406. The client information handling system identification may be resident within the program of instructions implementing the present method, or it may be provided by the client information handling system (e.g., embedded within the system's hardware processor), operating system, basic input/output system, etc.). As discussed in the description of FIG. 3B, token request engine 402 may further include a counter so that reiterative token requests may be made.

Token request 406 is received by server 102 whereupon it may be decrypted by encryption/decryption utility 412 (if encrypted) and passed to token assignment utility 410. Preferably, token assignment utility 410 first determines whether the token request 406 is valid. For example, token assignment utility 410 may compare the client information handling system identification embedded within the token request 406 with identifications of authorized clients stored in client database 414 to determine if client information handling system 104, 108 is a known client.

Token assignment utility 410, having found the client information handling system identification within the client database 414, may further verify whether the client information handling system 104, 108 is authorized to provide the function requested. For example, client database 414 may identify authorized functions that may be provided by known clients. Thus, once the identity of client identification handling system 104, 108 is verified, token assignment utility 410 may again interrogate the client database 414 to determine if the requested function is allowed.

Wherein token assignment utility 410 determines that token request 406 is invalid, it may either ignore the request, or take remedial action. Such remedial action may include messaging for informing the client information handling system 104, 108 that token request 406 is denied and optionally providing the reasons for its denial. Wherein token assignment utility 410 determines that token request 406 is valid, a token 416 is assigned to client information handling system 104, 108. Token 416 may be either a local encrypted token (LET) 116 or, optionally, a universal encrypted token (UET) 120 as discussed in the description of FIG. 1. Preferably, token 416 is encrypted by encryption/decryption utility 412 prior to transmittal.

Token request engine 402, having broadcast a token request 406, awaits receipt of a token 416. In an exemplary embodiment, token request engine 402 may include a timer that times out after a predetermined period wherein a token has not been received. Token request engine 402 may then either initiate a new token request 406 or disable function 408. Alternatively, token request engine 402 may wait indefinitely for receipt of a token 416. Wherein token 416 is received by client information handling system 104, 108, it is first decrypted by encryption/decryption utility 404 and passed to token request engine 402, which enables function 408. Alternatively, as discussed in the description of FIG. 3B, token request engine 402 may first verify that token 416 is valid, prior to enabling function 408.

In an exemplary embodiment, the present invention may be utilized to provide an anti-theft system for local client information handling systems 104, 108 connected to a network such as LAN 110 (FIG. 1). The function 408 enabled by a token 416, preferably a local encrypted token 116 (FIG. 1), in this embodiment, would be startup or booting of the local client information handling system 104, 108. For example, for the exemplary information handling system shown in FIG. 2, the program of instructions implementing the method of the present invention may be resident in the information handling systems basic input/output system (BIOS). Receipt of token 416 may be required to enable complete execution of the (BIOS) to start the client information handling system 104, 108. Alternatively, receipt of token 416 may allow the BIOS to enable loading of the information handling system's operating system.

Once startup is complete, the client information handling system 104, 108 may continue to operate even after it is disconnected from the network (LAN) 110 and the communication link with server 102 is severed. However, if the information handling system 104, 108 is again powered down (or optionally placed in a suspended or sleep mode), an additional startup would require receipt of a new token 416 from the server 102. Thus, the client information handling system 104, 108 would be disabled and unusable if permanently removed from the network 110, as it likely would be if it were to be stolen.

In another exemplary embodiment, the present invention may be utilized to prevent unauthorized access and copying of software applications and information resident on local client information handling systems 104, 108 connected to a network, such as LAN 110 (FIG. 1). The function 408 enabled by a token 416, preferably a local encrypted token 116 (FIG. 1), in this embodiment, would be loading of the software application for execution by the information handling system 104, 108. In this embodiment, for the exemplary information handling system shown in FIG. 2, the program of instructions implementing the method of the present invention may be provided by either the information handling system's operating system or the software application itself.

The present invention may further facilitate regular transfer of data between server 102 and client information handling system 104, 108. Client information handling systems 104, 108 utilizing the present invention would be forced to more regularly establish a communication link with server 102 to receive authentication enabling desired functions 408. Server 102 could utilize this communication link to initiate necessary transfer of data between the server 102 and client information handling system 104. Such data may include data 418 such as information input by users and collected by the client information handling system 104, 108, system use information, etc., and data 420 such as updated software applications, commands, electronic mail, etc. provided by server 102 to client information handling system 104, 108.

Figure 5B:
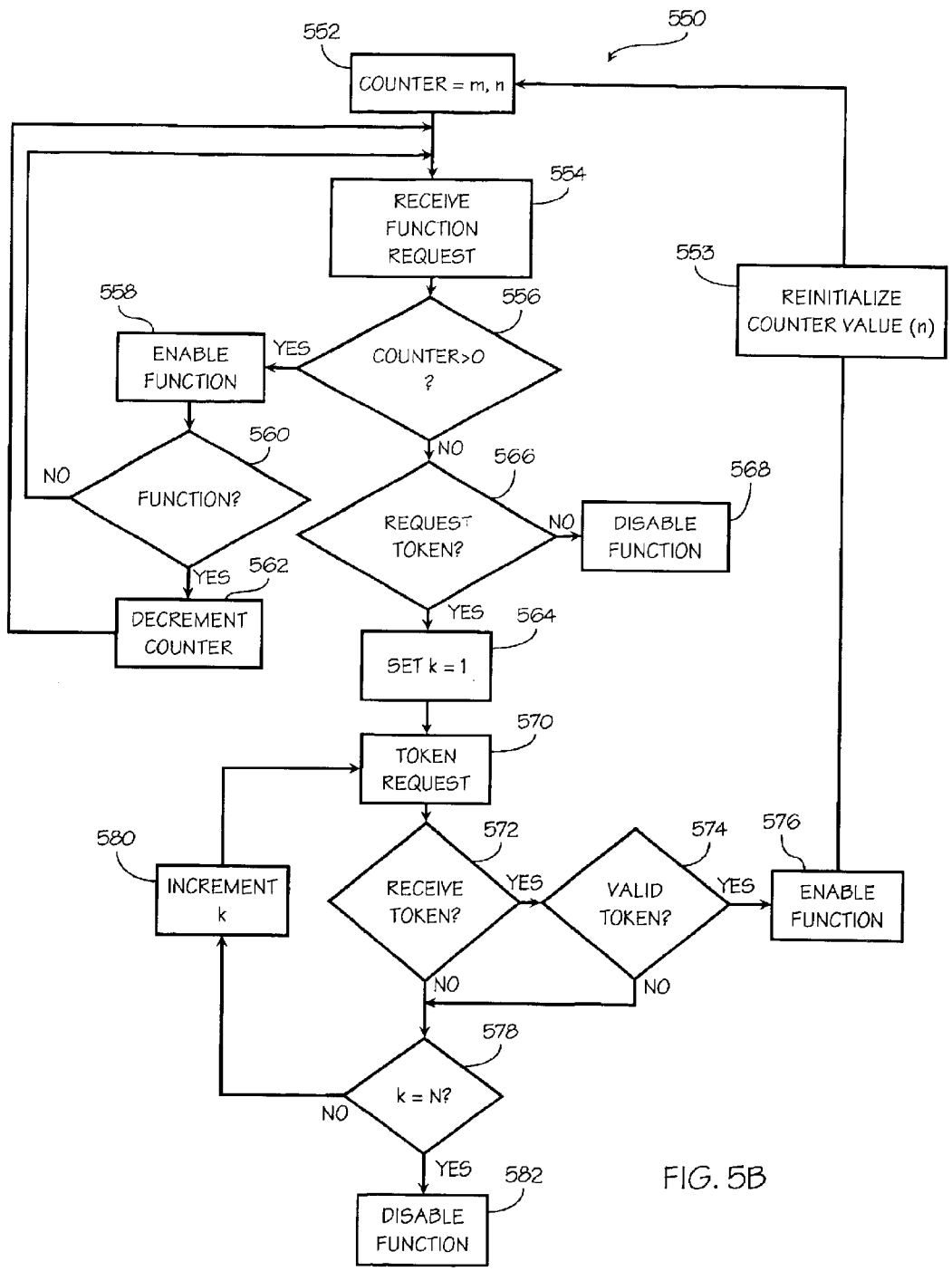
FIG. 5B is a flow diagram illustrating an alternative embodiment of the client portion of the method shown in FIG. 3A.
Figure 6:
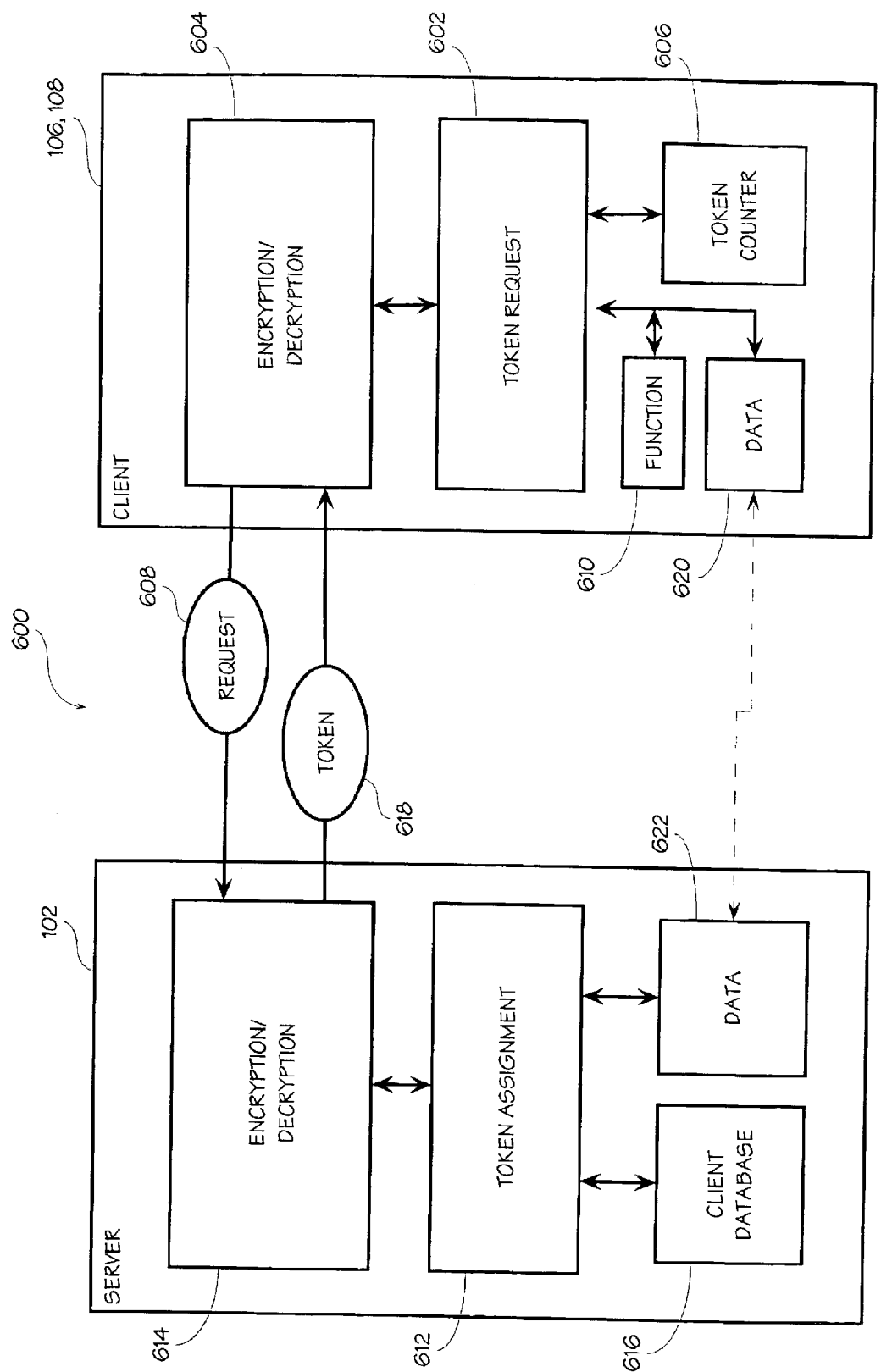
FIG. 6 is a block diagram illustrating interaction between the central system and a remote client information handling system.

Turning now to FIGS. 5A, 5B and 6, flow and block diagrams illustrating implementation of the method of the present invention in a remote client information handling system 106, or alternatively a local/remote information handling system 108 (see FIG. 1) functioning as a remote client information handling system are shown.

As shown in FIG. 5A, method 500 is initiated at step 502, wherein a counter (COUNTER) is initialized to a value (m) wherein (m) represents the number of allowed functions provided by remote client information handling system 106, 108 independent of server 102. Preferably, the counter (COUNTER) is decremented each time a particular function requiring authorization is provided by client information handling system 106, 108.

Upon receipt of a command to provide a function requiring authentication of the information handling system 106, 108, at step 504, a determination is made whether the counter is greater than zero (0), at step 506. Wherein the counter is greater than zero (0), the function is enabled, at step 508. A determination is then made, at step 510, whether the function was indeed provided by the client information handling system 106, 108. Wherein the function is for some reason not provided, the information handling system 106, 108 waits for receipt of another command to provide the function. Wherein the function is provided by the information handling system 106, 108, the counter (COUNTER) is decremented (i.e., $COUNTER_{n+1}=COUNTER_n-1$), at step 512. The information handling system 106, 108 then waits for receipt of another command to provide the function.

Wherein it is determined, at step 506, that the counter (COUNTER) is not greater than zero (0) (i.e., COUNTER=0), a determination may be made whether a token is to be requested, at step 514. The information handling system 106, 108 may, for example, query the user whether a communication link should be established with the server 102, and additional tokens should be requested. The user may also be warned at this time that failure to request additional tokens will result in disablement of the function. Wherein a determination is made not to request additional tokens, the function is disabled remotely by the information handling system 106, 108, at step 516. Wherein a determination is made to request additional tokens, a token request is initiated, at step 518, wherein the information handling system 106, 108 requests one or more tokens from the server 102 to provide continued authentication enabling the function. A communication link is established between server 102 and client information handling system 104 via a network such as LAN 112 or the Internet 112 shown in FIG. 1. This communication link may either be established in response to the function request 504, or may be preestablished, and thus may already be in existence when function request 504 is received. The token request broadcast at step 518 includes the identification of the client information handling system 106, 108. Preferably, this identification is permanently encoded within the client information handling system so that it cannot be changed by users of the system 106. The token request may further include additional information that may be required to determine whether the server should provide authentication to enable the function (e.g., whether the client information handling system 106, 108 is authorized to provide the function). Preferably, the token request is encrypted using known encryption techniques, to prevent tampering or alteration of the token request by users and third parties desiring unauthorized access to the function.

The token request by remote client information handling system 106, 108 is received, at step 520, by server 102 via the communication link. Server 102 next determines whether the token request is valid at step 522. For example, server 102 may first decrypt the token request if necessary. Server 102 may then compare the identification included within the token request with a database of known clients to verify the identity of the client information handling system 106, 108. Additionally, the server 102 may verify whether the client information handling system 106, 108 is authorized to provide the function requested.

Wherein it is determined that the token request is invalid, at step 522, server 102 may either ignore the request, or take remedial action 524. Such remedial action may include informing the client information handling system 106, 108 via the communication link that the token request is denied and optionally providing the reasons for its denial. Wherein it is determined that the token request is valid, one or more tokens (preferably Remote Encrypted Token (RET) or Universal Encrypted Token (UET) shown in FIG. 1) is assigned to client information handling system 106, 108 at step 526.

Client information handling system 106, 108, having requested a token at step 518, awaits receipt of a token at step 528. Wherein one or more tokens are received, the function is enabled at step 530 and counter (COUNTER) is reinitialized, at step 502, to a value (n) wherein (n) represents the number of functions allowed by the received tokens to be provided by remote client information handling system 106, 108 independent of server 102. The reinitialized value (n) may be selected or predetermined, and may or may not be the same as the initial value (m). Wherein it is determined that a token has not been received, for example after a predetermined period, the function is disabled, at step 516, until a token can be requested and received.

Alternately, as shown in FIG. 5B, remote client information handling system 106, 108 may employ method 550 employing a reiterative token request scheme. The reiterative method 550, like the basic method 500, begins at step 552 wherein a counter (COUNTER) is initialized to a value (m) wherein (m) represents the number of allowed functions provided by remote client information handling system 106, 108 independent of server 102. Further, like the basic method 500, the counter is decremented each time a particular function requiring authorization is provided by client information handling system 106, 108.

Upon receipt of a command to provide a function requiring authentication of the information handling system 106, 108, at step 554, a determination is made whether the counter is greater than zero (0), at step 556. Wherein the counter is greater than zero (0), the function is enabled, at step 558. A determination is then made, at step 560, whether the function was indeed provided by the client information handling system 106, 108. Wherein the function is for some reason not provided, the information handling system 106, 108 waits for receipt of another command to provide the function. Wherein the function is provided by the information handling system 106, 108, the counter (COUNTER) is decremented, at step 562. The information handling system 106, 108 then waits for receipt of another command to provide the function.

Wherein it is determined, at step 556, that the counter is not greater than zero (0), a determination is made whether a token is to be requested, at step 566. The information handling system 106, 108 may, for example, query the user whether a communication link should be established with the server 102, and additional tokens should be requested. The user may also be warned at this time that failure to request additional tokens will result in disablement of the function. Wherein a determination is made not to request additional tokens, the function is disabled remotely by the information handling system 106, 108 at step 568.

Alternately, wherein a determination is made to request additional tokens, a reiterative token request procedure is initiated. A second counter (k) representing the number of token requests broadcast by client information handling system 106, 108, is initialized at step 564. A token request is initiated, at step 570, wherein the information handling system 106, 108 requests one or more tokens from the server 102, to provide continued authentication enabling the function. A communication link is established between server 102 and client information handling system 106, 108 via a network such as LAN 112 or the Internet 112 shown in FIG. 1. This communication link may either be established in response to the function request 554, or may be preestablished, and thus may already be in existence when function request 554 is received. The token request broadcast at step 570 includes the identification of the client information handling system 106, 108. Preferably, this identification is permanently encoded within the client information handling system so that it cannot be changed by users of the system 106, 108. The token request may further include additional information that may be required to determine whether the server should provide authentication to enable the function (e.g., whether the client information handling system 106, 108 is authorized to provide the function). Preferably, the token request is encrypted using known encryption techniques, to prevent tampering or alteration of the token request by users and third parties desiring unauthorized access to the function.

Client information handling system 106, 108, having requested one or more tokens, now awaits receipt of a token at step 572. Wherein a token is received, a second determination is made as to whether the received token is valid, at step 574. Wherein it is determined that a valid token is received, the function is enabled at step 576 and counter (COUNTER) is reinitialized, at step 553, to a value (n) wherein (n) represents the number of functions allowed by the received tokens to be provided by remote client information handling system 106, 108 independent of server 102. Alternately, wherein a token has not been received at step 572, or wherein the received token is determined to be invalid at step 574, an additional determination is made whether the counter (k) is equal to a predetermined number of allowed request broadcasts (N) 578. If counter (k) is less than N, counter (k) is incremented at step 580 and a token request is again initiated at step 570. However, if counter (k) is equal to N, the function is disabled, at step 582.

As shown in FIG. 6, the method of the present invention may be implemented in the remote client information handling system 106, 108 as a program of instructions storable on a medium readable by the information handling system 106, 108. In an exemplary embodiment, this program of instructions is comprised of a token request engine 602, an encryption/decryption utility 604, and a token counter utility 606. A corresponding program of instructions storable on a medium readable by the server 102 includes a token assignment utility 612, an encryption/decryption utility 614 and a client database utility 616.

Token counter utility 606 may be initialized to a value (m) wherein (m) represents the number of allowed functions provided by remote client information handling system 106, 108 independent of server 102. Preferably, the value (m) may be set by a controlling organization or user such as an enterprise's management information service (MIS) organization before the client information handling system 106, 108 is taken to a remote location by the user. For example, the value (m) may initially be set when the program of instruction implementing method 500 or 550 is loaded onto information handling system 106, 108. Likewise, after the program of instructions is loaded, the remote information handling system 106, 108 may be connected to server 102 by a communication link established via LAN 110 or Internet 112 (FIG. 1) wherein the token counter utility 606 is initialized to the value (m) by server 102.

Token request engine 602 receives commands or requests to provide functions 610 requiring authentication and interrogates token counter utility 606 to determine if the counter is greater than zero (0) so that the function can be authorized. Wherein the token counter utility 606 is found to be greater than zero (0), token request engine 602 enables the function 610 and monitors the information handling system 106, 108 to determine whether the function 610 is successfully provided.

Wherein the function is provided by the information handling system 106, 108, token request engine 602 decrements token counter utility 606 and waits for receipt of another command to provide the function 606. Wherein token request engine 602 determines that token counter 606 is equal to zero, token request engine 602 will no longer enable function 610 unless additional tokens (preferably, remote encrypted tokens (RET)) resetting token counter 606 are received, or unless the client information handling system 106, 108 is connected to the server 102 via a LAN 110 (FIG. 1) for receipt of a local encrypted token (LET).

Token request engine 602 may then initiate a process whereby a request for additional tokens 608 may be made. In an exemplary embodiment, token request engine 602 may first determine whether requesting additional tokens is desired by the system user. The token request engine 602 may, for example, cause the information handling system 106, 108 to query the user whether a communication link should be established with the server 102 and additional tokens requested. The user may also be warned at this time that failure to request additional tokens will result in disablement of the function 610. Wherein token request engine 602 determines that the user wishes to request additional tokens to enable the function, a token request 608 is initiated. However, wherein the token request engine 602 determines that the user does not wish to request additional tokens, the function 610 is disabled remotely. Alternatively, the token request 608 may be initiated automatically so that it is invisible to the user.

The token request 608 may optionally be encrypted by encryption/decryption utility 604 using known encryption techniques to prevent tampering or alteration of the token request 608 by users and third parties desiring unauthorized access to the function 610. Preferably, token request engine 602 embeds the client information handling system identification and any other necessary information within the token request 608. The client information handling system identification may be resident within the program of instructions implementing the present method, or provided by the client information handling system (e.g., embedded within the system's hardware (processor), operating system, basic input/output system, etc.). Additional information may include the number and type of tokens 608 requested. As discussed in the description of FIG. 5B, token request engine 602 may further include a counter so that reiterative token requests may be provided.

Token request 608 is received by server 102 whereupon it may be decrypted by encryption/decryption utility 614 (if encrypted) and passed to token assignment utility 612. Preferably, token assignment utility 612 first determines whether the token request 608 is valid. For example, token assignment utility 612 may compare the client information handling system identification embedded within the token request 608 with identifications of authorized clients stored in client database 618 to determine if client information handling system 106, 108 is a known client.

Token assignment utility 612, having found the client information handling system identification within the client database 616 may further verify whether the client information handling system 106, 108 is authorized to provide the requested function. For example, client database 616 may identify authorized functions that may be provided by known clients. Thus, once the identity of client identification handling system 106, 108 is verified, token assignment utility 612 may interrogate the client database 616 to determine if the requested function is allowed. Wherein token assignment utility 612 determines that token request 608 is invalid, it may either ignore the request, or take remedial action. Such remedial action may include messaging for informing the client information handling system 106, 108 that token request 608 is denied and optionally providing the reasons for its denial. Wherein token assignment utility 612 determines that token request 608 is valid, a determination is made regarding the number of tokens to be assigned information handling system 106, 108 and thus what new value (n) is to be credited to the information handling system's token counter 606. Token assignment utility 612 may then assign one or more tokens 618 providing (n) functions to the client information handling system 106, 108. Tokens 618 may be either a remote encrypted token (RET) or, optionally, a universal encrypted token (UET) as described in the discussion of FIG. 1. Preferably, tokens 618 are encrypted by encryption/decryption utility 614 prior to transmittal.

Token request engine 602, having broadcast a token request 608, awaits receipt of a token 618. In an exemplary embodiment, token request engine 602 may include a timer which times out after a predetermined period wherein a token has not been received. Token request engine 602 may then either initiate a new token request or disable function 610. Alternatively, token request engine 602 may wait indefinitely for receipt of a token. Wherein one or more tokens 618 are received by client information handling system 106, 108, the tokens 618 are decrypted by encryption/decryption utility 604 and passed to token request engine 602, which resets token counter 606 to a value (n) corresponding to the number of functions authorized by tokens 618 and enables function 610. As discussed in the description of FIG. 5B, token request engine 602 may first verify that token 618 is valid, prior to enabling function 610.

In an exemplary embodiment, the present invention may be utilized to provide an anti-theft system for remote client information handling systems 106, 108 which may be connected to server 102 via a temporary (Internet) connection 112 and thus are normally not part of a permanent network connection such as a LAN 110 (FIG. 1). Such information handling systems could include, for example, portable computers such as notebook or laptop computers utilized by an enterprise at remote sites (e.g., traveling sales persons, engineers or architects visiting work sites, etc.). The function 610 enabled, in this embodiment, would be startup or booting of the remote or local/remote client information handling systems 104 & 106. For example, for the exemplary information handling system shown in FIG. 2, the program of instructions implementing the method of the present invention may be part of the information handling system's basic input/output system (BIOS). Token counter 606 may be kept in the information handling system's non-volatile random access memory (NVRAM).

Client information handling system 106, 108 is initially allowed (m) boot/suspends wherein token request engine 602 may enable complete execution of the (BIOS) to start the system 106, or alternatively loading of the information handling system's operating system. Once (m) boot/suspends are provided, the client information handling system 106, 108 must authenticate, via establishing a communication link with the server 102 so that token request engine 602 may request one or more remote encrypted tokens (RET). Receipt of one or more remote encrypted tokens (RET) allows the client information handling system 106, 108 (n) additional boot/suspend sequences, after which the client information handling system 106, 108 is disabled unless further remote encrypted tokens are requested (RET) and received, or the client information handling system 106, 108 is connected to server 102 via a local network (LAN) and a local encrypted token (LET) is requested and received. Preferably the m and n counts are preassigned by the MIS organization in charge of the remote information handling systems 106, 108.

The present invention may further facilitate regular transfer of data between server 102 and remote client information handling systems 106, 108. Client information handling systems 106 utilizing the present invention would be forced to more regularly establish a communication link with server 102 to receive authentication enabling desired functions 610. Server 102 could utilize this communication link to initiate necessary transfer of data between the server 102 and client information handling system 106, 108. Such data may include data 620 such as information input by users and collected by the client information handling system 106, 108, system use information, etc., and data 622 such as updated software applications, commands, electronic mail, etc. provided by server 102 to client information handling system 106, 108. For example, wherein the present invention were used by a traveling salesperson, frequent connection between the server 102 and client information handling system 106, 108 required by the system could be used to automatically download orders to the server 102, update the salesperson's order management software, and upload inventory information for future sales.

In another exemplary embodiment, the present invention may be utilized to prevent unauthorized access and copying of software applications and information resident on remote client information handling systems 104 connected to a network such as LAN 110 or the Internet 112 (FIG. 1). The function 610 enabled, in such an embodiment by the methods 500 or 550 of the present invention, would be loading of the software application for execution, or execution of the software application by the information handling system 106, 108. In this embodiment, for the exemplary information handling system shown in FIG. 2, the program of instructions implementing the method of the present invention may be provided by either the information handling system's operating system or the software application itself.

In yet another exemplary embodiment, the method of the present invention may be utilized in electronic commerce, i.e., commercial activity utilizing information handling systems connected via an online information service, the Internet, or a bulletin board service (BBS). The function 610 enabled, in such an embodiment, would be execution of the software application by the client information handling system 106, 108 and the program of instructions would be provided by the software application itself.

For example, a developer of a software application, an information provider, or the like may utilize the present invention to facilitate micro-billing of consumers for use of software applications and/or information provided. For instance, in such an embodiment, a particular software developer may provide a complementary copy of a software application, such as a video gaming application, to potential consumers. The developer may, for example, allow the general public to download the complementary copy from an Internet or BBS site. A program of instructions implementing the methods of the present invention is embedded in the software application so that deletion or disablement of the program of instructions will also permanently disable the software application. Thereafter, in order to use the software application, the consumer's computer, convergence system, PC/TV system etc. which comprises the client information handling system 106, 108 of FIG. 6, must periodically establish a communication link with the developer's computer, or server 102, via the Internet site to purchase tokens 618. The purchased tokens 618 provide credit for continued enablement and use of the software application. In this manner, the developer may incrementally charge for use of the software application. Further, wherein the consumer tires of, and no longer utilizes, the software application, or if payment for use of the application is not received, its use will be automatically and remotely disabled.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for enabling a function of an information handling system configured for communication with a central system via a communication link, the method comprising the steps of:

providing communication between the information handling system and the central system via the communication link;

requesting authentication via the communication link from the central system for enabling the function on the information handling system; and upon receipt of the authentication from the central system, enabling the function to be performed independent of the communication link with the central system, the authentication comprising an encrypted token passed between the central system and the information handling system.

2. The method as recited in claim 1, wherein the authentication requesting step comprises communicating an identification for the information handling system to the central system.

3. The method as recited in claim 2, wherein the identification communicating step further comprises encrypting the information handling system identification.

4. The method as recited in claim 1, further comprising the steps of:
- receiving the authentication request from the information handling system in the central system;
- determining if the authentication request is valid; and
- upon validating the authentication request, providing authentication to the information handling system.

5. The method as recited in claim 4, further comprising the step of encrypting the authentication.

6. The method as recited in claim 4, further comprising the step of:
- upon determining that the authentication request is invalid, denying authentication.

7. The method as recited in claim 1, further comprising the step of:
- upon failure to receive authentication from the central system, disabling the function.

8. The method as recited in claim 7, wherein the authentication requesting step is repeated a predetermined number of times before disabling the function.

9. The method as recited in claim 1, further comprising the step of terminating the communication link prior to executing at least a part of the function.

10. The method as recited in claim 9, further comprising the step of disabling the function after usage of a predetermined number of functions enabled by the authentication has been reached.

11. The method as recited in claim 1, wherein the function comprises starting the information handling system.

12. The method as recited in claim 11, wherein starting the information handling system comprises executing a basic input/output system (BIOS).

13. The method as recited in claim 1, wherein the token allows provision of the function independent of the location of the information handling system relative to the central system.

14. The method as recited in claim 1, wherein the token allows provision of the function only from a predetermined location with regard to the communication link between the central system and the information handling system.

15. The method as recited in claim 1, wherein the token allows for execution of a predetermined number of functions from a remote location.

16. The method as recited in claim 1, wherein the function comprises loading an operating system.

17. The method as recited in claim 1, wherein the function comprises executing a software application.

18. The method as recited in claim 17, wherein each authentication received allows execution of the software application for a predetermined period of time.

19. The method as recited in claim 1, further comprising:
- ending the communication between the information handling system and the central system via the communication link after receipt of the authentication; and
- thereafter, performing the function.

20. A program of instructions storable on a medium readable by an information handling system for implementing a method enabling the information handling system to execute a function, said information handling system being configured to communicate with a central system via a communication link, the steps comprising:
- providing communication between the information handling system and the central system via the communication link;
- requesting authentication via the communication link from the central system for enabling the function on the information handling system;
- receiving the authentication request from the information handling system in the central system;
- determining if the authentication request is valid;
- upon validating the authentication request, providing authentication to the information handling system; and
- upon receipt of the authentication from the central system, enabling the function to be performed independent of the communication link with the central system.

21. The program of instructions as recited in claim 20, wherein the authentication requesting step comprises communicating an identification for the information handling system to the central system.

22. The program of instructions as recited in claim 21, wherein the identification communicating step further comprises encrypting the information handling system identification.

23. The program of instructions as recited in claim 20, further comprising the step of encrypting the authentication.

24. The program of instructions as recited in claim 20, further comprising the step of:
- upon determination that the authentication request is invalid, denying authentication.

25. The program of instructions as recited in claim 20, further comprising the step of:
- upon failure to receive authentication from the central system, disabling the function.

26. The program of instructions as recited in claim 25, wherein the authentication requesting step is repeated a predetermined number of times before disabling the function.

27. The program of instructions as recited in claim 20, further comprising the step of terminating the communication link prior to executing at least a part of the function.

28. The program of instructions as recited in claim 27, further comprising the step of disabling the function after usage of a predetermined number of functions enabled by the authentication has been reached.

29. The program of instructions as recited in claim 20, wherein the function comprises starting the information handling system.

30. The program of instructions as recited in claim 29, wherein starting the information handling system comprises executing a basic input/output system (BIOS).

31. The program of instructions as recited in claim 20, wherein the function comprises loading an operating system.

32. The program of instructions as recited in claim 20, wherein the function comprises executing a software application.

33. The program of instructions as recited in claim 32, wherein each authentication received allows execution of the software application for a predetermined period of time.

34. The program of instructions as recited in claim 20, further comprising the steps of:
- ending the communication between the information handling system and the central system via the communication link after receipt of the authentication; and
- thereafter, performing the function.

35. An information handling system comprising:
- a processor for executing a program of instructions on the information handling system;
- a memory coupled to the processor for storing the program of instructions executable by the processor; and
- a communication device coupled to the processor for establishing a communication link between the information handling system and a central system via a network;

said program of instructions being capable of configuring the information handling system to request authentication from the central system via the communication link for enabling a function, and upon receipt of authentication from the central system, enabling the function, wherein the program of instructions is capable of configuring the information handling system to terminate the communication link prior to execution of at least part of the function, the function being performed independently of the central system.

36. The information handling system as recited in claim 35, wherein the program of instructions further configures the information handling system to communicate an identification to the central system.

37. The information handling system as recited in claim 36, wherein the information handling system identification is encrypted.

38. The information handling system as recited in claim 35, wherein the central system, upon receiving the authentication request from the information handling system, determines if the authentication request is valid, and upon determination that the authentication request is valid, providing authentication to the information handling system.

39. The information handling system as recited in claim 38, wherein the authentication is encrypted.

40. The information handling system as recited in claim 38, wherein the central system, upon determining that the authentication request is invalid, denies authentication.

41. The information handling system as recited in claim 35, wherein the program of instructions further configures the information handling system to disable the function if authentication is not received from the central system.

42. The information handling system as recited in claim 41, wherein the authentication request is repeated a predetermined number of times before disabling the function.

43. The information handling system as recited in claim 35, wherein the program of instructions is capable of configuring the information handling system to disable the function after usage of a predetermined number of functions enabled by the authentication has been reached.

44. The information handling system as recited in claim 35, wherein the function comprises starting the information handling system.

45. The information handling system as recited in claim 44, wherein starting the information handling system comprises executing a basic input/output system (BIOS).

46. The information handling system as recited in claim 35, wherein the function comprises loading an operating system.

47. The information handling system as recited in claim 35, wherein the function comprises executing a software application.

48. The information handling system as recited in claim 47, wherein each authentication received allows execution of the software application for a predetermined period of time.

49. The system as recited in claim 35, wherein the program of instructions is further capable of configuring the information handling system to end the communication between the information handling system and the central system via the communication link after receipt of the authentication, and, thereafter, to perform the function.

50. An information handling system comprising:
means for executing a program of instructions on the information handling system;
means, coupled to the executing means, for storing the program of instructions executable by the executing means;
means, coupled to the executing means, for establishing a communication link with a central system via a network;
said program of instructions being capable of configuring the information handling system to request authentication from the central system via the communication link for enabling a function, and upon receipt of authentication from the central system, enabling the function, wherein the program of instructions is capable of configuring the information handling system to terminate the communication link prior to execution of at least part of the function, the function being performed independently of the central system.

51. The information handling system as recited in claim 50, wherein the program of instructions further configures the information handling system to communicate an identification to the central system.

52. The information handling system as recited in claim 51, wherein the information handling system identification is encrypted.

53. The information handling system as recited in claim 50, wherein the central system, upon receiving the authentication request from the information handling system, determines if the authentication request is valid, and upon determination that the authentication request is valid, providing authentication to the information handling system.

54. The information handling system as recited in claim 53, wherein the authentication is encrypted.

55. The information handling system as recited in claim 53, wherein the central system, upon determining that the authentication request is invalid, denies authentication.

56. The information handling system as recited in claim 50, wherein the program of instructions is capable of configuring the information handling system to disable the function if authentication is not received from the central system.

57. The information handling system as recited in claim 56, wherein the authentication request is repeated a predetermined number of times before disabling the function.

58. The information handling system as recited in claim 50, wherein the program of instructions further configures the information handling system to disable the function after usage of a predetermined number of functions enabled by the authentication has been reached.

59. The information handling system as recited in claim 50, wherein the function comprises starting the information handling system.

60. The information handling system as recited in claim 59, wherein starting the information handling system comprises executing a basic input/output system (BIOS).

61. The information handling system as recited in claim 50, wherein the function comprises loading an operating system.

62. The information handling system as recited in claim 50, wherein the function comprises executing a software application.

63. The information handling system as recited in claim 62, wherein each authentication received allows execution of the software application for a predetermined period of time.

64. The system as recited in claim 50, wherein the program of instructions is further capable of configuring the information handling system to end the communication between the information handling system and the central system via the communication link after receipt of the authentication, and, thereafter, to perform the function.

* * * * *